United States Patent Office 3,594,289

Patented July 20, 1971

3,594,289

PROCESS FOR PREPARING A PRESENSITIZED PHOTOLITHOGRAPHIC PRINTING PLATE

Leonard James Watkinson, Leeds, and Brian Joseph Moore, Garforth, Leeds, England, assignor to W. H. Howson Limited, Seacroft, Leeds, England No Drawing. Filed Nov. 12, 1968, Ser. No. 775,164
Claims priority, application Great Britain, Nov. 15, 1967, 52,084/67
Int. Cl. C23f *17/00;* C23b *9/02*
U.S. Cl. 204—38A 12 Claims

ABSTRACT OF THE DISCLOSURE

Process for producing a presensitised lithographic printing plate comprising (i) anodising a sheet of aluminium or aluminium alloy using a phosphoric acid as electrolyte (ii) coating the sheet with a photopolymerisable resin and (iii) optionally colouring the resin coating.

This invention relates to a process for preparing improved presensitised printing plates from aluminium, or an alloy thereof capable of being anodised, coated with a photopolymerisable resin, which plates, after exposure to radiation and suitable development, may be used to produce many thousands of impressions.

The production of lithographic printing plates from anodised aluminum sheet has been practiced successfully for many years by the "Deep Etch" or "Gum Reversal" process. It has been shown that the anodic surface of the aluminum sheet confers very improved wearing and printing properties to a plate over and above those of non-anodised aluminum plates.

Anodised aluminium sheets, with or without a grained surface, have been used for diazo sensitised plates. In this case, the anodic layer is very thin and acts as a barrier layer between the light sensitive diazo coating and the base aluminum, which coating and base would otherwise slowly react on storage. British patent specification No. 851,819 describes such a plate.

There are fundamentally two types of an anodic film which can be produced on aluminium, namely non-porous and porous films. It is the porous films which are suitable for lithographic purposes, since the porous film confers a better water receptive surface to the non-image areas of the plate and allows image-forming material to anchor effectively to the surface by penetrating the pores. Porous anodic films may be produced on aluminium sheet by passing a direct current through a 15 volume percent aqueous solution of sulphuric acid using the aluminum as the anode and lead as the cathode. This method appears to be the only method used at the present time, it being noted that this method is simple, cheap and easily controlled. However, it has been found that in general the presensitised plates produced by applying a photopolymerisable resin to aluminium sheet anodised by the aforementioned conventional sulphuric acid process do not have printing surfaces (after suitable exposure to radiation and development) which are acceptable as far as resistance to machine wear is concerned. In an attempt to improve the wearing properties, many variations in the conditions of forming the anodic film on the aluminium, such as altering the current density, the duration of the current flow and the temperature of the electrolyte, have been used, resulting in aluminium sheets having layers of anodic film from 0.2 to 2 microns thick and of varying porosity. However, printing plates produced from aluminium sheet anodised in these various ways have not been lithographically acceptable.

It is therefore an object of the present invention to provide a presensitised printing plate which after exposure and development will give a printing plate which will have improved wear resistance.

In order to be lithographically acceptable, a printing plate should have a printing surface which includes non-printing areas which have good water receptivity and printing areas which are well anchored and tough. It is an object of the present invention to provide a presensitised printing plate which are exposure and development has a lithographically improved printing surface.

Accordingly, the present invention provides a process for preparing a presensitised printing plate, which comprises electrolytically anodising an aluminium or aluminium alloy sheet using an aqueous solution of phosphoric acid as the electrolyte and coating the anodised surface with a photopolymerisable resin. The anodised plates must be washed, and normally dried before the coating is applied thereto.

It has surprisingly been found that printing plates produced from presensitised printing plates prepared by the process of the invention have very improved wearing properties and are capable, after being suitably processed, of producing many thousands of good quality copies. This is believed to be due to the fact that anodising with an aqueous solution of phosphoric acid as electrolyte gives an anodic film of improved porosity to which the resin is more firmly anchored.

The porosity of the anodic film produced on the sheet increases as the concentration of the phosphoric acid in the electrolyte increases. Generally, the electrolyte consists of a 5 to 40% v./v. aqueous solution of 1.75 S.G. phosphoric acid. If an electrolyte more concentrated than a 50% v./v. aqueous solution of 1.75 S.G. phosphoric acid is used, problems arising from "drag-out" occur. The anodic film should be such as to enable the photopolymerisable resin to be securely anchored thereto and to retain, in the non-printing areas, sufficient water to prevent scumming of such areas. If the anodic film is too porous, the non-printing areas tend to takeup ink during printing. In order to obtain optimum porosity, it is preferred to use a 10 to 30% v./v. solution of 1.75 S.G. phosphoric acid as electrolyte. The current density is preferably from 0.5 to 2.0 amperes per square decimetre and in practice this is achieved by maintaining the voltage in the range of from 10 to 50 volts. The temperature of the electrolyte can be from 15 to 40° C. At temperature below 15° C., hard anodising tends to occur. However, at temperatures greater than 30° C. dissolution tends to occur and the film tends to be too porous. It is preferred therefore to maintain the electrolyte at a temperature of from 15 to 30° C.

The anodising time may be from 2 to 20 minutes and is dependent upon the electrolyte temperature. In general, the higher the electrolyte temperature the shorter the anodising time. In practice, the anodising time is from 2 to 10 minutes.

The photopolymerisable resins which may be used in accordance with the present invention are well known in the art. Suitable commercially available resins are produced inter alia by the Dynachem Corporation of Downey, Calif. U.S.A. (e.g. their DCR and DPR range of photopolymerisable negative working resins) and by the Philip A. Hunt Chemical Corporation of Pallisades N.J., U.S.A. It is preferred to use a photopolymerisable resin which is an organic solvent-soluble ester of an unsaturated acid and a polyalcohol. Examples of such photopolymerisable resins are polyvinyl cinnamate, starch cinnamate, cellulose cinnamate, starch furfurylacrylate, cellulose furfurylacrylate and polyvinyl furfurylacrylate resins. A commercially available example of such a resin is "Kodak Photo Resist" which is believed to be a polyvinyl cinnamate. Moreover, photopolymerisable resins obtained by the reaction of an epoxy resin with an unsaturated acid or derivative thereof and photopolymerisable resins which are cinnamic acid esters of polyester or polyether alcohols derived from epoxy resins may be used (such as described in British patent specifications No. 913,764 and No. 921,530).

In the process of the present invention a grained or ungrained aluminium or aluminium alloy sheet may be used. A grained sheet is however preferred since this provides better water recptivity. It is also preferred to use a sheet having a surface which has been mechanically or electrochemically roughened, so that the non-printing areas of the resultant printing plate retain the fountain solution during printing more readily. Printing plates obtained from the presensitised printing plates of the present invention are normally capable of producing 100,000 good quality copies. In fact, 750,000 copies have been produced from such a plate.

To process a presensitised printing plate made by the process of the present invention, it should be placed under a negative and exposed to a source of actinic radiation, for example a 50 ampere carbon arc for 2 minutes at a distance of 3 feet from the plate. After exposure, the image is formed by the dissolving away of the unexposed portion of the resin with a suitable developer. Suitable developers include a solvent for the unexposed photopolymerisable resin, such as dimethylformamide, and generally a desensitising colloid. Examples of suitable developers are disclosed in the specifications of our copending British patent applications Nos. 35,072/63 and 30,056/64 (British Pats. Nos. 1,102,952 and 1,114,251, respectively).

In our copending U.S.A. patent application No. 639,612, there is disclosed a presensitised photolithographic printing plate comprising an aluminium sheet coated with a photopolymerisable resin evenly coated with a colourant. On exposing and developing such a plate, a printing plate having visible printing areas is produced without the need to render the printing areas visible by a separate processing step after development or by using a suitably coloured developer. It has been found that even better printing plates having visible printing areas can be produced by anodising the aluminium sheet with phosphoric acid in accordance with the present invention prior to applying the photopolymerisable resin and colourant. Such printing plates have tough adherent visible printing areas and have non-printing areas of good water receptivity. The plates have good ink/water balance characteristics and are capable of producing a very large number of good quality copies.

Accordingly, in a preferred embodiment of the present invention there is provided a process for preparing a presensitised printing plate which comprises electrolytically anodising an aluminium or aluminium alloy sheet using an aqueous solution of phosphoric acid as the electrolyte, coating the anodised surface with a photopolymerisable resin and applying a colourant to the resin coating.

Suitable colourants are, for example, dyestuffs, finely divided pigments or pigment dispersions, but preferably the colourant is a pigment dispersion. Exemplary of suitable colourants are azoic compounds such as Permanent Bordeaux F2R (C.I. Pigment Red 12), anthraquinoid compounds such as Indanthrene Blue (C.I. Vat Blue 4), Phthalocyanine Blue or Green (C.I. Pigment Blue 15 or C.I. Pigment Green 7) or heavy metal complexes of a basic dye such as Victoria Blue (C.I. Pigment Blue 1). The colourant is applied over the photopolymerisable resin layer after the resin coated sheet has dried and the sheet is again dried. The vehicle used to apply the colourant should not dissolve the photopolymerisable resin coating and the colourant should have a good affinity for the photopolymerisable resin coating when treated with solvents during the subsequent development process. It has been found that these requirements are met by applying the colourant from a solvent such as an alcohol or glycol, e.g. ethyl alcohol, propyl alcohol, butyl alcohol, methyl-isobutyl carbinol, ethylene glycol, ethylene glycol-monomethyl ether or ethylene-glycol-mono-ethyl ether.

In this preferred embodiment, after the presensitised printing plate has been exposed to actinic radiation under a photographic negative for a time sufficient to insolubilise the exposed portion of the photopolymerisable resin, layer, a clear colourless developer is applied to the plate, for example, by swabbing with a sponge, cellulose wadding or cotton wool, or by spraying, to remove the unexposed portion of the photopolymerisable resin layer and thereby produce a visible image constituted by the coloured exposed portion of the photopolymerisable resin layer which image is of good contrast to the background of the plate. If desired, the background of the plate can be densensitised to printing ink by the same action. After rinsing excess developer off the plate with water, the plate is ready for use on a printing machine. It may, however, be desensitised with a suitable desensitiser or, after being wiped with gum arabic solution and dried, be stored for later use.

The clear colourless developer used in accordance with this preferred embodiment of the present invention, can be one of two types that is either the colourless emulsion type or the colourless solvent type. Both types of developer must contain an organic solvent capable of dissolving unexposed photopolymerisable resin and optionally they may also be capable of desensitising the non-prining background of the lithographic plate. The solvent to be employed can be readily determined by those skilled in the art having regard to the particular photopolymerisable resin used. For example, a photopolymersiable resin layer consisting of polyvinyl cinnamate is soluble in hydrocarbons, such as toluene and/or exylene, in admixture with ethyl alcohol; chlorinated hydrocarbons such as trichloroethylene, perchloroethylene and chlorobenzene; esters, such as amyl acetate and methyl amyl acetate; glycol ether acetates, such as 2-methoxy-ethyl acetate, 2-ethoxyethyl acetate and 3-methoxy-butyl acetate; alcohols, such as benzyl alcohol and tetrahydrofurfuryl alcohol; ketones such as methyliso-ampyl ketone, ethyl-iso-amyl ketone, di-iso-butyl ketone and cyclohexanone, and miscellaneous solvents such as tetralin, dimethyl formamide, dimethyl acetamide, benzaldehyde, nitrobenzene and nitropropane. For the preparation of a colourless emulsion developer, those solvents which are insoluble in water, or virtually so, should be selected from the above examples.

If, in accordance with the preferred embodiment of the present invention, it is desired to desensitise the non-printing areas of the plate, it is necessary to treat the plate with a material, such as colloid, which has suitable lithographic desensitising properties for printing plates. Suitable desensitising materials are gum arabic, synthetic materials such as methyl cellulose, ethyl hydroxyethyl cellulose, sodium carboxymethyl cellulose, sodium alginate and acrylamide copolymers, and phosphoric acid and citric acids and/or their salts. It should be noted that whilst all the above materials are water-soluble and thus when dissolved in water are capable of forming colourless emulsion developers with water-insoluble solvents, the choice of material for use in a colourless solvent developer is determined by its solubility in the particular solvent selected. If, however, the desensitising material is a colloid and the solvent used to dissolve the colloid is not capable of dissolving the unexposed photopolymerisable resin coating, another organic solvent which is capable of dissolving the unexposed photopolymerisable resin coating and which is miscible with the colloid solution may be added to produce a suitable colourless developer solution. Formulations of typical colourless developer solutions are disclosed in our copending patent application No. 727,656.

The following examples illustrate the invention.

EXAMPLE I

Any grease on a sheet of lithographic quality aluminum of 99.7% purity was removed by immersing in 6 percent w./v. aqueous solution of sodium hydroxide for 8 minutes. The degreased sheet was then imersed in a 25% v./v. aqueous solution of 1.75 S.G. orthophosphoric acid. The sheet was then connected up in a circuit as the anode, the cathode being made of lead, and a current having a density of 1.5 amperes per square decimetre of anode was passed through the plate for 8 minutes whilst the electrolyte was maintained at a temperature of 30° C. The anodised sheet was then rinsed with water and dried, after which it was coated with a photopolymerisable resin by whirling. This light-sensitive resin was "Kodak Photo Resist" which is believed to be a solution of polyvinyl cinnamate. After drying, the resultant presensitised plate was ready for use or packing and storage for many months, as required.

The above procedure was then repeated using a 2S grade aluminum sheet, commercially obtainable from Alcan Ltd' (Such sheets consist of about 99% aluminum and small amounts of iron and silicon.) In each case, a presensitised printing plate was obtained which, after exposure and development, gave rise to a printing plate capable of producing many thousands of good quality copies.

EXAMPLE 2

Two sheets of brush grained aluminum (grade 2S) were immersed in a bath of 10% v./v. aqueous solution of orthophosphoric acid of S.G. 1.75. The sheets were then electrically connected into a circuit and an alternating current was passed therebetween for 8 minutes at a voltage of 21.5 volts whilst the phosphoris acid solution was maintained at a temperature of 20° C. The current density varied from about 1.00 to 0.75 ampere per square decimetre. The thus anodised sheets, after being washed with water and drying were sprayed with a solution of polyvinyl cinnamate (Kodak Photo Resist) to produce a dry film on the sheets of 0.5 gram per square metre. The resin layer on the dried sheets was then coloured by applying thereto a composition comprising:

| | Parts by wt. |
|---|---|
| Irgalite Fast Red MPS 3 | 2 |
| Ester gum | 1 |
| Butyl alcohol | 87 |

and then drying. (Irgalite Fast Red MPS 3 is a dispersion of an azo pigment.) The resultant presensitised printing plates were then exposed for 3 minutes under a photographic negative to actinic radiation produced by a 50 amp carbon arc source at a distance of three feet. The plates were then swabbed with a clear colourless developer comprising:

| | Parts by volume |
|---|---|
| 2-methyl-ethyl acetate | 100 |
| Texofor DI | 50 |
| Phosphoric Acid S.G. 1.75 | 0.1 |

to remove the unexposed portions of the resin to leave a visible coloured image on the plates. (Texofor DI is a polyoxyethylene condensate of a glyceride oil.) The resultant printing plates were very wear resistant and capable of producing many thounsands of good quality copies.

EXAMPLE 3

Two sheets of aluminium of 99.7% purity were cleaned free from grease by immersion for 8 minutes in a 6% w./v. solution of sodium hydroxide. The sheets were washed with water and then immersed in a 0.5% w./v. solution of hydrochloric acid and connected to an electrical circuit. The circuit was such that an alternating current of current density 5.0 amps per square decimetre passed through the sheets. The hydrochloric acid solution was maintained at 30° C. and the current was passed for 6 minutes. As a result of this treatment, the surfaces of the sheets were roughened. The sheets were then washed with water and immersed in a bath of a 10% v.v. aqueous solution of orthophosphoric acid S.G. 1.75. The sheets were made the anodes in an electrical circuit and a steel cathode was provided. Direct current at 30 volts was passed through the circuit for 8 minutes whilst the bath was maintained at a temperature of 25° C. The sheets were then washed and dried and provided with a coating of polyvinyl cinnamate as in Example 2. The resin coating of each sheet was then coloured and the resultant presensitized printing plates exposed and developed in a manner similar to that described in Example 2. The composition used to colour the resin coating consisted of:

| | Parts by wt. |
|---|---|
| Iraglite Victoria Blue SGP 1 | 2 |
| Polyvinyl alcohol | 3 |
| Water | 95 |

and the clear colourless developer used to develop the exposed plate consisted of:

| | Parts by volume |
|---|---|
| Xylene | 100 |
| Polyoxyethylenesorbitan monopalmitate | 25 |
| Phosphoric acid S.G. 1.75 | 0.1 |

Irgalite Victoria Blue SGP 1 is a dispersion of a heavy metal complex of Victoria Blue.

The resultant printing plates were very wear resistant and capable of producing many thousands of good quality copies.

EXAMPLE 4

Two sheets of electrolytically etched aluminium (grade 2S) were immersed in a 15% v./v. aqueous solution of orthophosphoric acid 1.75. The sheets were connected in an electrical circuit and an alternating current at a constant voltage of 29 volts was applied for 4 minutes. The electrolyte temperature was 25° C. and the current density varied from 1.00 to 0.75 amps per square decimetre as the anodic film built up. The sheets were washed and dried and provided with a coating of polyvinyl cinnamate resin as in Example 2. The resin coating of each sheet aws then coloured and the resultant presensitised printing plates exposed and developed in the manner of Example 2. The resin was coloured by means of a composition comprising:

| | Parts by wt. |
|---|---|
| Irgalite Fast Blue NPS 2 | 2 |
| Shellac | 2 |
| Ethanol | 87 |

and the clear colourless developer used had the composition:

| | | |
|---|---|---|
| 3-methoxy-butyl-acetate | cc | 100 |
| Polyoxyethylene sorbitan monopalmitate | cc | 50 |
| Citric acid | g | 0.5 |

Irgalite Fast Blue MPS 2 is a dispersion of phthalocyanine blue.

The resultant printing plates were very wear resistant and capable of producing many thousands of good quality copies.

EXAMPLE 5

A sheet of electrochemically etched aluminium of 99.7% purity was immersed in a 20% v./v. aqueous solution of orthophosphoric acid of S.G. 1.75 and connected as the anode in an electrical circuit. A steel plate was used as the cathode. A direct current at a constant voltage of 30 volts was passed through the circuit for 6 minutes whilst the solution was maintained at a temperature of 20° C. The anodised sheet was then washed and dried and thereafter whirler coated with a polyvinyl cinnamate solution. After drying, the polyvinyl cinnamate coating was coloured and the resultant presensitised printing plate exposed and developed in the manner of Example 2. The resin coating was coloured using a composition comprising:

| | Parts by wt. |
|---|---|
| Microlith Red RT | 4 |
| Methyl-iso-butyl carbinol | 90 |

and the clear colourless developer used had the composition:

| | Parts by vol. |
|---|---|
| Tetrahydrofurfuryl alcohol | 150 |
| 2-methoxy-ethyl acetate | 400 |
| Texafor DI | 100 |
| Sulphuric acid (98% w./v.) | 4 |

Microlith Red RT is a dispersion of an azo pigment.

The resultant printing plates were very wear resistant and capable of producing many thousands of good quality copies.

We claim:

1. Process for preparing a presensitized photolithographic printing plate which comprises electrolytically anodizing an aluminum or aluminum alloy sheet using an aqueous solution of phosphoric acid as the electrolyte and coating the anodized surface with a photopolymerizable organic solvent-soluble resin ester of an unsaturated acid.

2. Process in accordance with claim 1, wherein the electrolyte is a 5 to 40% v./v. aqueous solution of phosphoric acid S.G. 1.75.

3. Process in accordance with claim 1, wherein the anodising is effected using a current density of from 0.5 to 2.0 amperes per square decimetre.

4. Process in accordance with claim 1, wherein the anodising is effected whilst the electrolyte is at a temperature of from 15 to 40° C.

5. Process in accordance with claim 1, wherein the anodising is effected for from 2 to 20 minutes.

6. Process in accordance with claim 1 wherein the photopolymerisable resin is selected from the group consisting of polyvinyl cinnamate, starch cinnamate, cellulose cimnnamate, starch furfurylacrylate, cellulose furfurylacrylate and polyvinyl furfurylacrylate.

7. Process in accordance with claim 1, which comprises anodising the sheet for from 2 to 10 minutes at a current density of from 0.5 to 2.0 amperes per square decimetre in an electrolyte which is a 10 to 30% v./v. aqueous solution of phosphoric acid S.G. 1.75 maintained at a temperature of from 15 to 30° C. and coating the anodised surface with a photopolymerisable resin which is selected from the group consisting of polyvinyl cinnamate, starch cinnamate, cellulose cinnamate, starch furfurylacrylate, cellulose furfurylacrylate and polyvinyl furfurylacrylate.

8. A presensitized photolithographic printing plate according to the process of claim 1 comprising an aluminum or aluminum alloy sheet having a surface electrolytically anodized in an aqueous phosphoric acid electrolyte, the anodized surface being provided with a coating of a photopolymerizable organic solvent-soluble resin ester of an unsaturated acid.

9. Process in accordance with claim 1 and comprising the further step of applying a colourant to the photopolymerisable resin coating.

10. Process in accordance with claim 9, wherein the colourant is a pigment, which process comprises applying a dispersion of the pigment in a liquid vehicle to the photopolymerisable resin coating, and then drying the coated resin.

11. Process in accordance with claim 9, wherein the colourant is selected from the group consisting of an anthroquinoid compound, a phthalocyanine compound and a heavy metal complex of a basic dye.

12. Process in accordance with claim 9, which comprises anodising the sheet for from 2 to 10 minutes at a current density of from 0.5 to 2.0 amperes per square decimetre in an electrolyte which is a 10 to 30% v./v. aqueous solution of phosphoric acid S.G. 1.75 maintained at a temperature of from 15 to 30° C., coating the anodised surface with a photopolymerisable resin which is selected from the group consisting of polyvinyl cinnamate, starch cinnamate, cellulose cinnamate, starch furfurylacrylate, cellulose furfurylacrylate and polyvinyl furfurylacrylate, applying to the resin coating a dispersion comprising a liquid vehicle and a colourant selected from the group consisting of an anthraquinoid compound, a phthalocyanine compound and a heavy metal complex of a basic dye, and drying the coated resin.

References Cited

UNITED STATES PATENTS

| | | | |
|---|---|---|---|
| 3,210,184 | 10/1965 | Uhlig | 96—1 |
| 3,181,461 | 5/1965 | Fromson | 101—149.2 |
| 3,148,057 | 9/1964 | Raether | 96—1 |
| 2,126,017 | 8/1938 | Jenny et al. | 95—8 |
| 3,511,661 | 5/1970 | Rauner et al. | 96—86 |

HOWARD S. WILLIAMS, Primary Examiner

R. L. ANDREWS, Assistant Examiner

U.S. Cl. X.R.

204—58; 96—86P